United States Patent [19]

von Bonin

[11] 4,207,227

[45] Jun. 10, 1980

[54] STABLE SUSPENSIONS OF INORGANIC FILLERS IN ORGANIC POLYHYDROXYL COMPOUNDS

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 856,075

[22] Filed: Nov. 30, 1977

[30] Foreign Application Priority Data

Dec. 3, 1976 [DE] Fed. Rep. of Germany ....... 2654746
Mar. 31, 1977 [DE] Fed. Rep. of Germany ....... 2714291

[51] Int. Cl.$^2$ .......................... C08K 9/04; C08L 75/04
[52] U.S. Cl. .......................... 260/40 TN; 260/33.2 R; 260/37 R; 260/40 R; 260/42.14; 260/42.53; 260/42.57 L
[58] Field of Search ............. 260/42.43, 33.2 R, 37 R, 260/40 R, 40 TN, 42.57, 42.53, 42.14

[56] References Cited

U.S. PATENT DOCUMENTS

| | | | |
|---|---|---|---|
| 3,637,909 | 1/1972 | von Bonin et al. | 260/873 |
| 3,767,587 | 10/1973 | Claussen et al. | 260/301.23 |
| 3,773,708 | 11/1973 | Takahashi et al. | 260/42.14 |
| 3,849,362 | 11/1974 | Economy et al. | 260/33.2 R |
| 3,966,672 | 6/1976 | Gaylord | 260/42.14 |
| 3,971,753 | 7/1976 | Frechtling et al. | 260/42.14 |
| 4,023,981 | 9/1977 | Perronin et al. | 260/42.14 |
| 4,042,558 | 8/1977 | von Bonin et al. | 260/2.5 BF |
| 4,077,804 | 3/1978 | Vanzo | 260/42.53 |
| 4,088,663 | 5/1978 | Yankee | 260/408 |

*Primary Examiner*—Ronald W. Griffin
*Attorney, Agent, or Firm*—Gene Harsh; Joseph C. Gil; R. Brent Olson

[57] ABSTRACT

The instant invention relates to a process for the preparation of stable suspensions of inorganic fillers in polyhydroxyl compounds, which are suitable for the preparation of polyurethanes, to the suspensions obtainable by this process and to their use for the preparation of polyurethanes. The suspensions are produced by grafting an olefinically unsaturated carboxylic acid (and optionally other olefinically unsaturated monomers) onto polyols. The presence of from 0.005 to 15% by weight of carboxyl groups in the polyol allows for the production of stable dispersion of inorganic fillers in polyols.

23 Claims, No Drawings

STABLE SUSPENSIONS OF INORGANIC FILLERS IN ORGANIC POLYHYDROXYL COMPOUNDS

BACKGROUND OF THE INVENTION

It has long been customary in the art to use combinations of organic and inorganic raw materials to produce combination materials, for example, for filling rubbers or thermoplastics with inorganic fillers, for pigmenting lacquers with inorganic pigments or for the manufacture of molding materials. These rubbers, thermoplastics and molding materials are mainly solid substances in which the fillers, once incorporated, maintain a virtually unchanged degree of distribution. In contrast, polyols conventionally used in polyurethane chemistry are liquid substances which change into solids or rubbery materials only after the reaction with the polyisocyanates.

Inorganic fillers generally have specific gravities above 2 whereas most polyols have specific weights of about 1. Suspensions of inorganic pigments in polyols will, therefore, settle out even if the pigments are very finely milled. This is particularly true if the polyols have relatively low viscosities, a condition generally necessary for processing purposes.

This characteristic constitutes a serious obstacle to the use of inorganic fillers in polyurethane chemistry. There is, therefore, an understandable desire to have such suspensions available in a form which is stable in storage so that they need not be mixed again during storage or before use.

Polyethers modified with vinyl polymers (including vinyl compounds containing carboxyl groups, e.g., acrylic acids) are discussed in U.S. Pat. Nos. 3,383,351; 3,304,273; 3,523,093; 3,110,695; and German Pat. No. 1,152,536. These patents, however, do not discuss the use of fillers.

It was, therefore, an object of the present invention to provide stable suspensions of inorganic fillers in polyols of the kind used for the production of polyurethanes.

DESCRIPTION OF THE INVENTION

It was surprisingly found that this problem could be solved by dispersing the inorganic fillers in polyhydroxyl compounds having carboxyl groups and diluting the resulting suspensions with polyhydroxyl compounds if necessary. The preparation of the polyhydroxyl compounds containing carboxyl groups may be carried out before or simultaneously with the dispersion process.

The present invention relates to suspensions which are stable in storge comprising:

(1) 0.5 to 80% by weight, based on the whole suspension, of an inorganic filler in (2) 20 to 99.5% by weight, based on the whole suspension, of polyhydroxyl compounds having aliphatically and or cycloaliphatically bound hydroxyl groups, wherein (a) 0.01 to 35% by weight, preferably 0.02 to 15% by weight, based on the component (2) of the suspension, of an olefinically unsaturated carboxylic acid and (b) 0 to 25% by weight, preferably 0.01 to 15% by weight, based on component (2) of the suspension, of other unsaturated monomers are grafted on the polyhydroxyl compounds by radical polymerization so that component (2) contains a total of 0.005 to 15% by weight, preferably 0.01 to 10% by weight, and most preferably 0.01 to 1% by weight, of carboxyl groups.

The present invention also relates to a process for the preparation of stable suspensions of inorganic fillers in polyhydroxyl compounds, characterized in that (a) a carboxyl-containing polyol obtained by grafting an olefinically unsaturated carboxylic acid and optionally other olefinically unsaturated monomers onto a polyhydroxyl compound having aliphatically and/or cycloaliphatically bound hydroxyl groups is mixed with the inorganic fillers, preferably with the addition of similar polyhydroxyl compounds which are free from carboxyl groups and optionally with the addition of from 0.01 to 5% by weight, preferably from 0.1 to 1% by weight, based on the filler, of a radical former to promote the grafting reaction, and, if desired, the resulting suspension is diluted with polyhydroxyl compounds which are free from carboxyl groups, or (b) a mixture of at least one polyhydroxyl compound having aliphatically and/or cycloaliphatically bound hydroxyl groups, at least one olefinically unsaturated carboxylic acid, optionally other olefinically unsaturated monomers, and optionally a radical former which can be activated by heat, and at least one inorganic filler is vigorously mixed and polymerized and, if desired, the resulting suspension of inorganic filler is diluted with polyhydroxyl compounds, the polyol component containing a total of from 0.005 to 15% by weight of carboxyl groups.

Lastly, the invention relates to the use of dispersions obtainable by the process according to the invention as starting components for the production of foamed and unfoamed polyurethane resins by the isocyanate polyaddition process.

Suitable inorganic fillers include, for example, kaolins, talcum, mica, tuff, lava, powdered asbestos, glass, chalk, dolomite, bentonites, alkali metal or ammonium phosphates and polyphosphates, alkaline earth metal phosphates and polyphosphates, carbon black, graphite, cements, calcium oxide and hydroxide, calcium sulphates, flue-dust, slag, powdered rock, titanium dioxide, iron oxides, aluminum oxides and hydroxides, quartz sand and powdered shale, silicates, and the like. Particularly suitable for the process according to the invention, apart from talcum, kaolin and aluminum hydroxides, are fillers which contain calcium carbonate, such as chalk or dolomite.

The term "inorganic fillers" as used in the present invention also includes the known inorganic pigments. It also includes inorganic fillers in which the surfaces have been pretreated with organic or inorganic compounds of a neutral, basic or acid character, for example, for the purpose of modifying their change or hydrophilic character. The inorganic fillers are generally solid, inorganic substances which may consist of particles in the form of needles, platelets or spherical pellets or of irregularly shaped particles and which may be amorphous, metamorphous or crystalline and in which the particle diameters are generally below 10 micron. The residue left on a 40 micron-sieve according to DIN 53,195 should generally be less than 1% by weight.

The continuous phases used for preparing the filler suspensions in the process according to the invention are carboxyl-containing polyhydroxyl compounds of the kind which can be obtained by grafting olefinically unsaturated carboxylic acids and, optionally, other vinyl monomers onto polyhydroxyl compounds of the kind generally known in polyurethane chemistry. The carboxyl containing polyhydroxyl materials are preferably used in admixture with polyhydroxyl compounds which are free from carboxyl groups.

The polyhydroxyl compounds which are modified by the grafting reaction mentioned above or also those used for mixing are preferably polyols of the kind generally known in polyurethane chemistry which are liquid at room temperature.

These compounds generally have from 2 to 8, and preferably 2 to 3, hydroxyl groups and molecular weights of above 500, generally from 500 to 10,000 and preferably between 1800 and 7000. Polyol mixtures may also be used which, in addition to containing polyols within the molecular weight range indicated above, also contain polyols with a lower molecular weight, preferably between 62 and 500, but these preferably amount to less than 70% by weight in the mixture. The preferred polyhydroxyl compounds are polyhydroxy polyesters, polyhydroxy polyethers, polyhydroxy polyacetals, polyhydroxy polycarbonates and polyhydroxy polyester amides conforming to the definitions given above. The polyhydroxy polyethers are particularly preferred, firstly because they generally have a relatively low viscosity and secondly because they form a good basis for grafting.

Suitable polyesters with hydroxyl groups include, for example, reaction products of polyvalent, preferably divalent alcohols, to which trivalent alcohols may be added, and polyvalent, preferably divalent carboxylic acids. Instead of free polycarboxylic acids, the corresponding polycarboxylic acid anhydrides or corresponding polycarboxylic acid esters of lower alcohols or mixtures thereof may, of course, be used for preparing the polyester. The polycarboxylic acids may be aliphatic, cycloaliphatic, aromatic and/or heterocyclic and they may be substituted, e.g., by halogen atoms, and/or unsaturated.

The following are examples of suitable acids: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid which may be mixed with monomeric fatty acids, dimethyl terephthalate and terephthalic acid-bis-glycol esters. The following are examples of suitable polyvalent alcohols: ethylene glycol, propylene glycol-(1,2) and -(1,3), butylene glycol-(1,4) and -(2,3), hexanediol-(1,6), octanediol-(1,8), neopentylglycol, cyclohexane dimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol, and sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones such as ε-caprolactone or hydroxycarboxylic acids such as ω-hydroxycaproic acid may also be used.

The polyethers used according to the invention which have at least 2, generally 2 to 8 and preferably 2 to 3 hydroxyl groups are also generally known and are prepared, for example, by polymerization of epoxides such as ethylene oxide, propylene oxide, butylene oxide, tetrahydrofuran, styrene oxide or epichlorohydrin, either each on its own, (e.g., in the presence of boron trifluoride) or, by addition of these epoxides, either as mixtures or successively, to starting components having reactive hydrogen atoms, such as water, alcohols, ammonia or amines. Suitable starting components include: ethylene glycol, propylene glycol-(1,3) or -(1,2), trimethylolpropane, 4,4'-dihydroxy-diphenylpropane, aniline, ethanolamine or ethylene diamine. Sucrose polyethers may also be used according to the invention, e.g., those described in German Auslegeschriften Nos. 1,176,358 and 1,064,938.

Polyethers modified with vinyl polymers, e.g., the compounds obtained by polymerization of styrene or acrylonitrile in the presence of polyethers as described in U.S. Pat. Nos. 3,383,351; 3,304,273; 3,523,093 and 3,110,695 and German Patent No. 1,152,536 are also suitable, as well as polybutadienes which have hydroxyl groups. Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for the purpose of the invention may also be prepared by the polymerization of cyclic acetals.

The polycarbonates with hydroxyl groups used may be of the kind known per se, for example, those which can be prepared by the reaction of diols such as propanediol-(1,3), butanediol-(1,4) and/or hexanediol-(1,6), diethylene glycol, triethylene glycol or tetraethylene glycol with diarylcarbonates, e.g., with diphenylcarbonate or phosgene.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Representatives of these compounds which may be used according to the invention are known and have been described, for example, in High Polymers, Volume XVI, "Polyurethanes, Chemistry and Technology", by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume III, Vieweg-Höchtlen, Carl-Hanser-Verlag, Munich, 1966, pages 45–71.

Mixtures of the above-mentioned compounds which contain at least two hydrogen atoms capable of reacting with isocyanates and have a molecular weight of from 500 to 10,000 may, of course, also be used, for example mixtures of polyethers and polyesters.

The starting components used according to the invention may also include compounds with molecular weights of from 62 to 500 which have at least two hydroxyl groups. These compounds also generally have from 2 to 8 hydroxyl groups, and preferably 2 or 3 hydroxyl groups.

The following are examples of such compounds: ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethylcyclohexane, 2-methyl-1,3-propanediol, glycerol, trimethylol propane, hexanetriol-(1,2,6), trimethylolethane, pentaerythritol, quinitol, mannitol and sorbitol and their ethoxylation and propoxylation products, diethylene glycol, triethylene glycol, tetraethylene glycol, polyethylene glycols with a molecular weight of up to 500, dipropylene glycol, polypropylene glycols with a molecular weight of up to 500, dibutylene glycol, polybutylene glycols with a molecular weight of up to 500, 4,4'-dihydroxy-diphenyl propane, dihydroxymethylhydroquinone, diethanaolamine and triethanolamine.

Polyhydroxyl compounds in which high molecular weight polyadducts or polycondensates are finely dispersed or dissolved may also be used according to the invention. Such modified polyhydroxyl compounds are obtained when polyaddition reactions (e.g., reactions between polyisocyanates and amino functional compounds or polycondensation reaction e.g., between formaldehyde and phenols and/or amines) are carried out in situ in the above-mentioned hydroxyl compounds. Processes of this kind have been described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. These modified polyhydroxyl compounds can also be obtained according to U.S. Pat. No. 3,869,413 or German Offenlegungsschrift No. 2,550,860 by mixing a previously prepared aqueous polymer dispersion with a polyhydroxyl compound and then removing the water from the mixture.

When modified polyhydroxyl compounds such as those indicated above are used as starting components for the polyisocyanate polyaddition process, the polyurethane resins obtained in many cases have substantially improved mechanical properties.

Any mixtures of the above-mentioned polyhydroxyl compounds may be used in the process according to the invention. The polyols may also be mixed with other additives, such as chain lengthening agents stabilizers, blowing agents, dyes, emulsifiers and water. However, it is preferred in making the dispersions according to the invention that pure polyols, without additives, be used.

The polyhydroxyl compounds used according to the invention are preferably polyether polyols because these are particularly suitable for preparing the suspensions according to the invention. Polyether polyols obtained from propylene oxide or ethylene oxide or mixtures thereof by known methods and having molecular weights of between about 1800 and 7000 are of particular interest in the context of this invention, especially those which have between 5 and 35% by weight, preferably between 12 and 30% by weight of ethylene oxide built into the molecule. In these polyether polyols the ethylene oxide may be incorporated statistically but it is preferably present either as polymer block at the chain ends of the polyether polyol or as mixed block with a built-in ethylene oxide content of more than 40% by weight situated within the chain of the polyether polyol. Mixed forms which are between the different types of polyethers mentioned above may, of course, also be used.

In the preferred variation of the process according to the invention, free carboxyl groups are introduced into the polyhydroxyl compound in a first stage of the process by a radical initiated graft polymerization reaction with unsaturated carboxylic acids and optionally other olefinically unsaturated monomers, preferably in the absence of organic solvents, so that the polyhydroxyl compound acts as the sole reaction medium for the graft polymerization reaction.

If desired, the whole quantity of the polyol which is finally present as continuous phase in the suspensions according to the invention may be introduced into the graft polymerization reaction but it is preferable if at first only part of the total quantity of polyol which will finally be present as continuous phase in the suspension is subjected to graft polymerization and the resulting graft polymers are then diluted with an unmodified polyol which may be either the same as or different from the first mentioned polyol.

In this first, preferred embodiment of the process according to the invention, dispersion of the inorganic filler is carried out after graft polymerization, while the abovementioned dilution with unmodified polyol, which should preferably be carried out, takes place before or after the process of dispersion. Dispersion is carried out with intimate mixing of the starting components over a period of from 0.1–12 hours at $-30°$ to $180°$ C., preferably $5°$ to $45°$ C.

The dispersion process may also be carried out in the presence of solvents, e.g., water, acetone, ethyl acetate, methylene chloride, methanol, dimethyl formamide, toluene, chlorobenzene or dioxane. Any solvent used in the process is generally removed by distillation after the dispersion process.

When sedimentation of the filler occurs in the previously known filler-containing polyols, it can be recognized by two effects. If a test tube is filled with such an unstable suspension, a clear layer of polyhydroxyl compound virtually free from filler soon forms just below the liquid level. At the same time, a deposit of filler particles settles at the bottom of the test tube so that after some time three more or less distinctly separate layers can be seen.

It has been found that the first mentioned effect, serum-like separation of the dispersion medium on the surface, can reliably be prevented by the process according to the invention. However, some filler suspensions still tend to form deposits at the bottom of the vessel. It is found that this unwanted phenomenon can also be suppressed if, in such cases, temperatures above $60°$ C. are avoided during preparation of the suspension, i.e., during and after incorporation of the filler, that is to say at the second stage of the process described above, the temperatures are kept within a range of from $-+°$ C. to $60°$ C., preferably from $5°$ to $45°$ C. This is a surprising finding since one would have expected that the reactions between carboxyl-containing polymer and the surface of the filler particle, which presumably are responsible for making the suspension stable, would take place more rapidly and completely at higher temperatures than at low temperatures.

According to a second embodiment of the process of the invention, the process of dispersion and the graft polymerization reaction may be carried out as a one-pot process. In this case, a mixture of unmodified polyol, inorganic filler, unsaturated carboxylic acid, optionally radical former, and optionally other olefinically unsaturated monomers is intimately mixed at a temperature above the decomposition temperature of the radical former, i.e., at $-30°$ to $180°$ C., preferably at $5°$ to $45°$ C., for a period of from 0.5 to 12 hours. Any auxiliary solvent used is removed after this one-pot process and, if desired, the suspension obtained is diluted with unmodified polyol. In this second embodiment of the process according to the invention it is also in many cases advisable to use temperatures of between $-30°$ and $60°$ C., preferably between $5°$ and $45°$ C., to prevent the formation of a ground deposit of filler particles in the suspension.

In both embodiments of the process, it is advisable to employ an inert gas atmosphere, for example a nitrogen atmosphere.

The quantity of unsaturated carboxylic acids to be used in the grafting reaction is generally calculated so that the polyol present as continuous phase in the suspension contains from 0.005–15% by weight, preferably from 0.01 to 10% by weight and most preferably from 0.01 to 1% by weight of carboxyl groups.

By graft polymers are preferably meant in the context of this invention those products which are obtained when, as described above, a polyol or mixture of polyols is mixed with an $\alpha,\beta$-olefinically unsaturated carboxylic acid, optionally in the presence of a solvent, and optionally with the addition of other olefinically unsaturated monomers which are free from carboxylic acid groups. The mixture is then polymerized by radical polymerization, either by adding a radical former and heating to the decomposition temperature of the radical former or by heating the reaction mixture without the addition of radical former to a temperature at which thermal polymerization takes place. Polymerization may, of course, also be initiated by high energy radiation.

The known radical formers of polymerization chemistry may be used. Examples include those based on azo compounds or those based on peroxidic compounds or so-called Redox-systems. The following are examples of particularly suitable radical formers: azodiisobutyronitrile; dibenzoylperoxide; t-butyl peroxide; cumene hydroperoxide; di-t-butyl peroxide; dicumyl peroxide and, particularly, t-butyl peroxide and radical formers which are active at relatively low temperatures, e.g., peroxide/amine, peroxide/ascorbic acid, boron alkyl compounds/air, peroxide/SO$_2$, H$_2$O$_2$/Fe$^{2+}$ and peroxidic compounds which decompose at low temperatures, e.g., diisopropyl percarbonate.

The $\alpha,\beta$-unsaturated carboxylic acids used include maleic acid anhydride, maleic or fumaric acid or their semiesters and semiamides or itaconic acid, and particularly acrylic acid and methacrylic acid. Because of its ready availability, acrylic acid is the preferred $\alpha,\beta$-unsaturated carboxylic acid for the preparation of the graft polymers used according to the invention.

The quantity of $\alpha,\beta$-unsaturated carboxylic acids used for preparing the graft polymers which may subsequently be diluted is generally from 0.01–35% by weight, preferably 0.02–15% by weight, based on the whole polyol component. It is particularly advantageous to use from 5–15% by weight of the $\alpha,\beta$-unsaturated carboxylic acid and later to add the resulting graft polymer to an additional quantity of polyol.

Other olefinically unsaturated monomers which may be used in quantities of up to 25% by weight, preferably from 0.01 to 15% by weight, based on the continuous phase, include, for example, vinyl halides, vinyl esters, (meth)acrylonitrile, (meth)acrylamides, (meth)acrylic acid esters and maleic or fumaric or itaconic acid semiesters or esters and aromatic vinyl compounds. Vinyl acetate, vinyl propionate, acrylonitrile and styrene should be particularly mentioned, although the use of other polar monomers such as aminoalkyl(meth) acrylates, hydroxyalkyl(meth) acrylates, N-alkyl(meth) acrylamides, vinyl pyrrolidone or vinyl pyridine may occasionally provide advantages.

These monomers may be used in addition to the $\alpha,\beta$-unsaturated carboxylic acids occasionally improve the compatibility of the graft polymer in the polyol as well as the stability of the suspension of the invention.

Particularly preferred for the invention are graft (co)-polymers of polyether polyols, acrylic acid or methacrylic acid and optionally styrene, because these graft polymers are generally readily soluble in the unmodified polyols.

Preparation of the graft polymers may be carried out in situ, as already mentioned above, for example, by mixing the whole quantity of the polyol provided for preparing the suspension with the $\alpha,\beta$-unsaturated carboxylic acid and optionally other monomers and then carrying out the polymerization. It is preferred, however, first to prepare the graft polymer separately and then to add it to the other components used for preparing the suspension, so that the whole polyol phase preferably contains from 0.05–50% by weight, most preferably from 0.2–15% by weight of the graft polymer and the amount of unmodified polyol required to make the percentage up to 100.

The stabilized suspensions of inorganic fillers in polyols obtained according to the invention contain between about 0.5% by weight and 80% by weight of filler. The filler contents are preferably between 10 and 45% by weight, most preferably between 15 and 35% by weight, based on the whole suspension.

The suspensions prepared according to the invention may subsequently be degasified, gassed, dried or mixed with additives. They may also be mixed with other fillers or with polyols containing fillers. They are also suitable for use as starting material for the preparation of other types of modified polyols, for example, as starting material for the preparation of so-called polymer polyols, e.g., by grafting them with styrene-acrylonitrile mixtures as described in, e.g., U.S. Pat. Nos. 3,383,351; 3,304,351; 3,304,273, 3,523,093 and 3,110,695 already mentioned above and German Patent No. 1,152,536. Other organic filler particles such as particles of polyureas or polyhydrazo dicarbonamides may be prepared in them in situ as described in German Auslegeschriften Nos. 1,168,075 and 1,260,142 and German Offenlegungsschriften Nos. 2,324,134; 2,423,984; 2,512,385; 2,513,815; 2,550,796; 2,550,797; 2,550,833 and 2,550,862. The suspensions according to the invention are particularly valuable starting materials for the preparation of polyurethanes by the isocyanate polyaddition process. They are suitable for the production of flexible, rigid and semi-rigid foamed polyurethane resins as well as for the production of unfoamed polyurethanes, for example, polyurethane elastomers or duromers.

Preparation of the suspensions according to the invention will be explained below with the aid of examples.

The percentages and parts given are percentages by weight and parts by weight unless otherwise indicated.

EXAMPLE 1

The polyol used is a polyether of approximately 25% of ethylene oxide and approximately 75% of propylene oxide which has been started on trimethylol propane and has a molecular weight of approximately 4800. The proportion of primary hydroxyl groups is less than 3%. The ethylene oxide content is in the form of a mixed block containing 20% by weight of propylene oxide in the polyether chain.

Preparation of the graft polymer 10 parts of styrene, 20 parts of acrylic acid and 0.5 parts of t-butyl peroctoate are dissolved in 200 parts of the polyol. The reaction mixture is then heated to 90° C. for 4 hours in a nitrogen atmosphere with stirring. The graft polymer is obtained as a clear, viscous mass.

Preparation of the suspension 52 parts of the graft polymer are dissolved in 400 parts of the polyol. 80 parts of a filler are then added and the mixture is stirred for 5 hours at 85° C. and then cooled with stirring.

A similar experiment without the addition of graft polymer is carried out for comparison purposes.

The following fillers were used for the experiments:

Filler M: aragonite; residue on 40 $\mu$m-screen: less than 0.1%; upper section: 10 $\mu$m; average particle diameter; 3 $\mu$m; fraction finer than 2 $\mu$m 35%.

Filler O: microcrystalline champagne-chalk; upper section: 5 $\mu$m; average particle diameter: 1 $\mu$m; fraction finer than 2 $\mu$m: 90%.

Filler H: crystalline calcium carbonate; upper section: 7 $\mu$m; average particle diameter: 1.5 $\mu$m; fraction finer than 2 $\mu$m: 70%.

Testing of the suspension

When the suspensions have been cooled, they are poured into test tubes to a height of 10 cm. They are left to stand for 15 days at 21° C. and the amount of settling of the suspension is then assessed. The height of the sedimentation boundary above the bottom of the test tube, measured in mm, is given as the sedimentation number (SN). If no sedimentation occurs, the sedimentation number (SN) is 100, i.e., the closer the number to 100, the less tendency the suspension has to sedimentation under the conditions of the experiment. This method of testing and the sedimentation number described here apply to all examples 1–14 unless otherwise indicated.

The following experimental results are obtained:

| Filler M: | Comparison experiment | SN = 35 |
|---|---|---|
| | Suspension according to the invention | SN = 99.5 |
| Filler O: | Comparison experiment | SN = 72 |
| | Suspension according to the invention | SN = 100 |
| Filler H: | Comparison experiment | SN = 55 |
| | Suspension according to the invention | SN = 99.5 |

The sedimentation values obtained demonstrate that fillers which have been reacted with the graft polymer have distinctly less tendency to sedimentation than those which have not been so treated.

EXAMPLE 2

The same polyol is used as in Example 1. Filler M and filler D are used. Filler D is crystalline pyrenean calcite; upper section 10 $\mu$m; average particle diameter: 3 $\mu$m; fraction finer than 2 $\mu$m; 40%.

The graft polymer prepared in Example 1 is used. A comparison sample using no graft polymer and a suspension according to the invention are prepared from polyol, 16% of filler, and 2, 4 and 8%, respectively, of the graft polymer under the same conditions as in Example 1. The following sedimentation numbers are obtained after 15 days:

| | Filler M | Filler D |
|---|---|---|
| Comparison Experiment | SN = 36 | SN = 55 |
| 2% graft polymer | SN = 72 | SN = 100 |
| 4% graft polymer | SN = 99 | SN = 99.5 |
| 8% graft polymer | SN = 100 | SN = 99.5. |

The values obtained show that even very small quantities of graft polymer are sufficient for stabilization.

EXAMPLE 3

Filler M and the same polyol as in Example 1 are again used.

A series of suspensions of Filler M are prepared as in Example 2. In addition, another test series is carried out in which 0.5% of t-butyl peroctoate is added to all the samples including the comparison sample at 85° C. before the components are mixed. The following values are obtained in the sedimentation test:

| | Without radical former | | With radical former |
|---|---|---|---|
| Comparison | SN = 36 | | SN = 41 |
| 2% graft polymer | SN = 72 | | SN = 99.5 |
| 4% graft polymer | SN = 99.5 | | SN = 99 |
| 8% graft polymer | SN = 100 | | SN = 99. |

The experiments demonstrate the additional stabilizing effect of adding radical former, particularly in the presence of small quantities of graft polymer.

EXAMPLE 4

The experiment carried out with filler H in Example 1 and the comparison experiment are repeated but with a polyether containing approximately 55% of propylene oxide and 45% of ethylene oxide which has a molecular weight of about 2200 and has been started on propylene glycol as the polyol base for the graft polymer. The sedimentation value obtained for the comparison test is SN=51 and for the suspension according to the invention it is SN=98.

EXAMPLE 5

The polyol used is a polyether which has been started on glycerol and contains approximately 83% of propylene oxide and approximately 17% of ethylene oxide as block at the chain end (molecular weight approximately 4900).

Preparation of the graft polymer 200 parts of polyol, 25 parts of methacrylic acid and 0.5 parts of p-butyl peroctoate are mixed with stirring and heated to 90° C. for 5 hours.

Preparation of the suspension 16 parts of type D filler are stirred into a mixture of 6 parts of graft polymer and 78 parts of polyol. The mixture is then heated to 70° C. for 3 hours, 120° C. for 1 hour and 85° C. for 1 hour and then cooled with stirring. A similar experiment is carried out without the addition of graft polymer for comparison.

The following sedimentation numbers are obtained: Comparison experiment: SN=76, suspension according to the invention: SN=100.

EXAMPLE 6

77 parts of the polyol according to Example 5, 3 parts of acrylic acid and 0.5 parts of t-butyl peroctoate are stirred together at 85° C. under nitrogen for 8 hours. 20 parts of Filler D are then stirred in at this temperature and stirring is continued for a further 3 hours at 90° C. The mixture is then cooled. A comparison experiment is carried out in a similar manner but without acrylic acid. The following sedimentation numbers are obtained: Comparison experiment: SN=70, suspension according to the invention: SN=99.5.

EXAMPLE 7

67 parts of the polyol according to Example 5, 20 parts of Filler M, 0.3 parts of t-butyl peroctoate and 0.2 parts of azodiisobutyronitrile are heated to 80° C. under nitrogen. A solution of 3 parts of acrylic acid in 10 parts of the polyol is added over a period of about 10 minutes with stirring and the mixture is left to react for 8 hours at 80° C. and then cooled. The sedimentation number of the resulting suspension is found to be SN=99.

EXAMPLE 8

The polyol used is a polyester of adipic acid and diethylene glycol with hydroxyl end groups and a molecular weight of 2000.

The graft polymer is prepared by reacting a mixture of 200 parts of polyol, 20 parts of acrylic acid, 10 parts of acrylonitrile and 0.6 parts of t-butyl peroctoate for 6 hours at 90° C. The H filler is used.

The suspension is prepared by reacting a mixture of 77 parts of polyol and 8 parts of graft polymer with 15 parts of filler at 70° C. for 12 hours.

An analogous experiment is carried out for comparison without the graft polymer. The following sedimentation numbers are obtained: Comparison experiment: SN=83; suspension according to the invention: SN=99.5.

EXAMPLE 9

The polyol used is a mixture of 85% of the polyol from Example 5 and 15% of a polyol which has been obtained from 1 mol of trimethylol propane by molecular addition of 5 mol of propylene oxide. The graft polymer is prepared by stirring together 200 parts of the polyol mixture, 20 parts of acrylic acid and 0.5 parts of t-butyl peroctoate for 8 hours at 85° C.

Types M and D fillers are used.

To prepare the suspension, 15 parts of graft polymer are stirred together with 15; 20; 25, 30; 35 and 40 parts, respectively, of filler and the quantity of polyol mixture necessary to bring the total weight up to 100, for 8 hours at 90° C. The sedimentation values obtained after cooling according to Example 1 are in all cases above 99.

EXAMPLE 10

This example serves to explain the effect on the process according to the invention of using various types of fillers.

The dispersing medium used is a polyether with hydroxyl number 34 which has been obtained by first adding 83% of propylene oxide and then 17% of ethylene oxide to trimethylol propane.

The graft polymer is prepared by stirring a mixture of 0.5 parts of t-butyl peroctoate, 10 parts of acrylic acid and 98.5 parts of the above-mentioned polyether for 10 hours at 85° C.

The suspensions are prepared by stirring 25 parts of filler into a mixture of 0; 2; 4; 8 parts of the graft polymer, respectively, and in some cases 0.5 parts of t-butyl peroctoate and the quantity of above-mentioned polyether necessary to make the total up to 100 parts. The mixture is then stirred for 5 hours at 90° C., and cooled. The sedimentation is tested as in Example 1.

All the fillers investigated were finely milled. The residue on the 40 μm-screen was less than 0.1%, the upper section was 10 μm and the average particle diameter was approximately 3 μm.

The following sedimentation numbers were obtained:

| Mineral | Peroctoate | SN in a reaction mixture containing | | | |
|---|---|---|---|---|---|
| | | 0 | 2 | 4 | 8 |
| | | % of graft polymer | | | |
| Kaolin, crude | (Used) + | 75 | | 99 | |
| Kaolin, calcined | (Not Used) − | 60 | | 99 | |
| NH$_4$ polyphosphate | − | 77 | 95 | | |
| Dolomite | − | 85 | | | 100 |
| Talcum | − | 70 | | | 100 |
| Talcum | + | 85 | | | 100 |
| Aluminum hydroxide | − | 90 | | 100 | |
| Alumina cement | − | 80 | | 95 | |
| Mica | + | 70 | | 94 | |
| Portland cement | − | 60 | 89 | | |
| Portland cement | + | 77 | 89 | | |
| Wollastonite | − | 69 | | 98 | |
| Limestone | − | 70 | 99 | | 100 |

Example 11

EXAMPLE 11

25 parts of Filler M and 70 parts of the polyether used in Example 10 are stirred together and heated to 80° C. under nitrogen. A solution of 0.8 parts of azodiisobutyronitrile in a mixture of 2.5 parts of acrylic acid and 2.5 parts of methacrylic acid is then added dropwise over a period of 15 minutes and the mixture is stirred for a further 8 hours at 80° C.

A suspension with sedimentation number 99–100 is obtained.

EXAMPLE 12

The procedure is the same as in Example 11 except that maleic acid isopropyl semiester is used instead of methacrylic acid.

The suspension obtained has a sedimentation number of 99.

EXAMPLE 13

30 parts of Filler O and 64 parts of the polyether used in Example 10 are stirred together. A solution of 0.5 parts of t-butyl peroctoate and 0.3 parts of di-tertiary butyl-peroxide in 6 parts of acrylic acid and 3 parts of styrene is then stirred in at room temperature. The reaction mixture is heated to 85° C. for 3 hours and then to 135° C. for 3 hours. The resulting suspension has a sedimentation number of 99–100.

EXAMPLE 14

3 parts of acrylic acid and 0.5 parts of t-butyl peroxide are stirred into 75 parts of the polyether used in Example 10. The mixture is heated to 90° C. for 4 hours and 22 parts of the dolomite used in Example 10 are then stirred in. The mixture is stirred for a further 2 hours at 110° C. and cooled.

The experiment is then repeated except that 1.5 parts of styrene and 1.5 parts of acrylonitrile are used in addition to the acrylic acid. For comparison purposes, the first experiment is also carried out without the addition of acrylic acid.

The sample obtained in the comparison experiment has a sedimentation value of SN=87, the sample obtained with acrylic acid: SN=99, the sample prepared with the monomer mixture: SN=100.

The following four commercially pure polyols were used for Examples 15–20:

Polyol 1: A bifunctional mixed polyether of 20% ethylene oxide and 80% propylene oxide started on propylene glycol. Molecular weight approximately 4000. (Ethylene oxide as block at the chain ends.)

Polyol 2: Trifunctional polyether of 25% ethylene oxide and 75% propylene oxide started on trimethylol propane. Molecular weight approximately 4800. (Ethylene oxide containing 20% of propylene oxide as mixed block built into the polyether chain).

Polyol 3: Trimethylol propane propoxylated with 5 mol of propylene oxide.

Polyol 4: Trifunctional polyether of 17% ethylene oxide and 83% propylene oxide started on glycerol. Molecular weight approximately 4900. (Ethylene oxide as block at the chain ends).

The fillers described above were used, and in addition Filler T: Dolomite: upper section: 9 μm; average particle diameter: 3 μm; fraction finer than 2 μm: approximately 45%.

The graft polymers used as stabilizers were prepared according to the following general method:

Graft Polymer Type A: 10% of acrylic acid, 0.5% of t-butyl peroctoate and 89.5% of polyol were stirred for 12 hours at 85° C. under nitrogen.

Graft Polymer Type B: 10% of styrene, 10% of acrylic acid, 0.25% of azodiisobutyronitrile, 0.25% of t-butyl peroctoate and 79.5% of polyol were stirred at 70° C. for 3 hours and 90° C. for 4 hours under nitrogen.

Graft Polymer Type C: 10% of methacrylic acid, 5% of acrylic acid, 10% of styrene, 0.5% of t-butyl peroctoate and 74.5% of polyol were stirred for 8 hours at 88° C. under nitrogen.

The results of the experiments described below were assessed as follows:

The suspension which was to be assessed was poured into a graduated glass cylinder to a height of 10 cm. The cylinder was then placed into a heating cupboard at 45° C. and left there for 88 hours. The separation of polyol as a more-or-less clear top layer was inspected under a strong light and assessed as follows:

Sedimentation numbers of upper sedimentation layer ($S_1$):

$S_1$ = 1: no separation observed
2: separation layer less than 1 mm in thickness
3: separation layer between 1 and 3 mm
4: separation layer more than 3 mm.

The cylinder was again inspected under strong light to assess whether a bottom layer with a horizontal sedimentation boundary had been deposited at the bottom of the cylinder. The results were graded as follows:

Sedimentation numbers of lower layer ($S_2$):

$S_2$ = 1: no deposit observed
2: indication of a sedimentation boundary
3: clear separation of a bottom layer.

EXAMPLE 15

2800 parts of polyol 2 and the graft polymer of Type B prepared on the basis of this polyol are stirred together. 1200 parts of Filler D are then added and the mixture is stirred for 1½ hours at 20° C. The results are assessed in relation to the quantity of graft polymer used, as follows:

| Graft Polymer Parts | $S_1$ | $S_2$ | Remarks |
|---|---|---|---|
| 0 | 4 | 2 | Cloudy suspension |
| 10 | 2 | 1 | Smooth suspension |
| 20 | 1 | 1 | Smooth suspension |
| 40 | 1 | 1 | Smooth suspension |
| 80 | 2 | 1 | Slightly cloudy suspension |
| 160 | 3 | 1 | Cloudy suspension |

When for the sake of comparison, the experiment is repeated at 90° C., the following results are obtained:

| Graft Polymer Parts | $S_1$ | $S_2$ | Remarks |
|---|---|---|---|
| 0 | 4 | 2 | Smooth suspension |
| 10 | 3 | 3 | Smooth suspension |
| 20 | 2 | 3 | Smooth suspension |
| 40 | 1 | 3 | Smooth suspension |
| 80 | 1 | 3 | Smooth suspension |
| 160 | 1 | 3 | Smooth suspension |

These experiments show that suspensions prepared at the lower temperature have considerably less tendency to form a deposit at the bottom of the vessel. On the other hand, it is clear that if one considers the upper layer of polyol alone, the employment of elevated temperatures affords distinct advantages. Lastly, the experiments show that when the low temperature is employed and the correct stabilizer concentration is maintained, it is possible with the aid of a few simple preliminary tests to adjust the system to a stability maximum at which both sedimentation at the bottom of the vessel and separation of polyol are minimized.

Similar results are obtained when the experiment described above is carried out, not at 20° C. but at 10° C. and 30° C., respectively.

EXAMPLE 16

30 parts of polyol 4, 1 part of acrylic acid and 0.2 parts of t-butyl peroctoate are together heated to 90° C. for 5 hours under nitrogen. The mixture is then diluted with an additional 44 parts of polyol 4 and cooled to 5° C., and 25 parts of filler are stirred into the mixture over a period of 2 hours. For comparison, the filler is also stirred in at 100° C. The following results are obtained:

| Filler | $S_1$ (5° C.) | $S_1$ (100° C.) | $S_2$ (5° C.) | $S_2$ (100° C.) |
|---|---|---|---|---|
| M | 1–2 | 1 | 1 | 3 |
| O | 1 | 1 | 1 | 2 |
| T | 1–2 | 1 | 1 | 3 |
| H | 2 | 1 | 1 | 3 |
| D | 1 | 1 | 1 | 3 |

The results clearly show the reduced tendency to the formation of a ground deposit in experiments carried out at the lower temperature. If the experiment is carried out analogously with pure polyol 4 (without addition of acrylic acid), all the $S_1$ values obtained are 3 or worse.

EXAMPLE 17

A graft polymer of Type C is prepared on the basis of polyol 1. 1700 parts of polyol 1 and 30 parts of this graft polymer are vigorously stirred together. 600 parts of Filler D are then added and the mixture is stirred for a further 3 hours at 20° C.

The experiment is repeated at 120° C. and 70° C.; also at 20° C. without graft polymer, with 1730 parts of pure polyol 1. The following results are obtained:

| Experiment | $S_1$ | $S_2$ |
|---|---|---|
| Without graft polymer | 3 | 2 |
| At 20° C. | 1-2 | 1 |
| At 70° C. | 1-2 | 3 |
| At 120° C. | 1 | 3 |

EXAMPLE 18

2 parts of a graft polymer of Type A based on polyol 4 are added to a mixture of 15 parts of polyol 3 and 83 parts of polyol 2. The mixture is stirred vigorously and 33.5 parts of Filler M or D, respectively, are added with continued stirring. The mixture is then stirred for a further 3 hours at 22° C. For comparison, the same experiment is carried out at 90° C. and without the addition of graft polymer. The following results are obtained:

| | $S_1$ | $S_2$ |
|---|---|---|
| M, without graft polymer (22° C.) | 3 | 2 |
| M, with graft polymer (22° C.) | 1-2 | 1 |
| M, with graft polymer (90° C.) | 1 | 3 |
| D, without graft polymer (22° C.) | 3 | 2 |
| D, with graft polymer (22° C.) | 1 | 1 |
| D, with graft polymer (90° C.) | 1 | 3 |

The results show that both the top layer and the ground sedimentation can be suppressed by operating at low temperatures and using the graft polymer as stabilizer according to the invention.

EXAMPLE 19

90 parts of polyol 2, 1.5 parts of acrylic acid, 1.5 parts of styrene, 0.2 parts of azodiisobutyronitrile and 0.1 parts of t-butyl peroctoate are stirred together for 5 hours at 85° C. 20 parts of Filler D are then stirred in at the reaction temperature and the mixture is left to cool for about 30 minutes.

The experiment is then repeated except that this time the filler is stirred in only when the reaction mixture has been cooled to 18° C.

Whereas the assessment for the top layer sedimentation is in both cases $S_1=1-2$, the assessment for the ground sediment $S_2$ is 3 in the first experiment but 1 in the experiment carried out at 18° C.

EXAMPLE 20

2800 parts of polyol 4 are vigorously stirred together with increasing quantities of a graft polymer of Type B. 1200 parts of Filler D are then added and stirring is continued for about 3 hours at 15° C. The results obtained, compared with the results of an analogous test series carried out at 75° C. are shown in the following Table:

| Graft Polymer (Parts by Weight) | $S_1$ (15° C.) | $S_1$ (75° C.) | $S_2$ (15° C.) | $S_2$ (75° C.) | Viscosity |
|---|---|---|---|---|---|
| 0 | 2 | 3 | 2 | 2 | 68.0 |
| 10 | 1-2 | 2 | 2 | 2 | 69.0 |
| 20 | 1 | 1 | 1 | 3 | 70.2 |
| 40 | 1 | 1 | 1 | 3 | 74.4 |
| 80 | 1-2 | 1 | 1 | 3 | 76.0 |
| 160 | 2 | 1 | 1 | 3 | 79.2 |

These experiments show that the optimum conditions lie in the region of relatively small quantities of stabilizer and low temperatures for this filler as well. The viscosities (measured as through-flow time in seconds at 20° C. from a Ford cup with nozzle 6) given in the last column are those obtained for experiments carried out at 15° C.

EXAMPLE 21

A graft polymer of Type B is prepared on the basis of a polyether polyol in which 63% of propylene oxide, followed by a mixture of 15% of ethylene oxide and 15% of propylene oxide followed by 7% of ethylene oxide have been added to trimethylol propane as starter (molecular weight of polyether polyol approximately 4800). 0; 0.25 and 0.5 parts, respectively, of this graft polymer containing 10% of acrylic acid incorporated by polymerization are added to 70 parts of the unmodified polyether with stirring.

When the reaction mixture has dissolved, 30 parts of Filler D or M are added at 22° C. with stirring. The mixture is then stirred for a further 1.5 hours.

The following sedimentation values are obtained:

| Graft Polymer | $S_1$ (D) | $S_1$ (M) | $S_2$ (D) | $S_2$ (M) |
|---|---|---|---|---|
| 0 | 3 | 3 | 2-3 | 2-3 |
| 0.25 | 1 | 1-2 | 1-2 | 1 |
| 0.5 | 1 | 1 | 1 | 1 |

This Example clearly shows that even minute quantities of carboxyl groups, of the order of 0.01% in the whole polyol, are sufficient to produce a marked effect in accordance with this invention.

What is claimed is:
1. Suspensions which are stable in storage comprising:
   (1) 0.5 to 80% by weight (based on the whole suspension) of an inorganic filler in
   (2) 20 to 99.5% by weight (based on the whole suspension) of polyhydroxyl compounds having aliphatically and/or cycloaliphatically bound hydroxyl groups,
wherein,
   (a) 0.01 to 35% by weight, based on component (2) of the suspension, of an olefinically unsaturated carboxylic acid and
   (b) 0 to 25% by weight, based on component (2) of the suspension of other unsaturated monomers are grafted on the polyhydroxyl compounds by radical polymerization so that component (2)

contains a total of from 0.005 to 15% by weight of carboxyl groups.

2. A process for the preparation of stable suspensions of inorganic fillers in polyhydroxyl compounds comprising polymerizing
   (a) at least one olefinically unsaturated carboxylic acid in the presence of
   (b) at least one polyhydroxyl compound having aliphatically and/or cycloaliphatically bound hydroxyl groups,
and admixing
   (c) at least one inorganic filler to the polyhydroxyl compound before, during or after the polymerization reaction, component (a) being used in such an amount that the polyhydroxyl component of the suspension contains a total of from 0.005 to 15% by weight of carboxyl groups.

3. The process of claim 2 wherein a radical former which can be activated by heat is used for the polymerization.

4. The process of claim 2 wherein other unsaturated monomers are included in addition to the unsaturated carboxylic acid.

5. The process of claim 2 wherein the suspension of inorganic filler which results from the mixing and polymerizing is diluted with additional polyhydroxyl compounds.

6. The process of claim 2 wherein a carboxyl group-containing polyol is first obtained by grafting said olefinically unsaturated carboxylic acid on said polyhydroxyl compound and then the resulting carboxyl group-containing polyol is mixed with said inorganic filler.

7. The process of claim 6 wherein said olefinically unsaturated carboxylic acid is grafted only on part of said polyhydroxyl compound and the remaining part of polyhydroxyl compound which is free from carboxyl groups is added to the carboxyl group-containing polyol before the addition of the filler.

8. The process of claim 6 wherein the grafting reaction is carried out in the presence of a radical former.

9. The process of claim 6 wherein the resulting dispersion is diluted with polyhydroxyl compounds which are free from carboxyl groups.

10. The process of claim 2 wherein temperatures above 60° C. are avoided during and after addition of the inorganic filler.

11. The process of claim 2 wherein the suspension is kept within a temperature range of between 5° and 45° C. during and after addition of the inorganic filler.

12. The process of claim 2 wherein the polyhydroxyl compounds are mixed polyethers based on propylene oxide and ethylene oxide and having molecular weights of between 1800 and 7000.

13. The process of claim 7 wherein the graft polymers which are mixed with polyhydroxyl compounds which are free from carboxyl groups have been obtained by the polymerization of from 1–15% by weight of $\alpha,\beta$-unsaturated carboxylic acids in the presence of polyhydroxyl compounds.

14. The process of claim 2 wherein the polyhydroxyl compound used as dispersing agent contains a total of from 0.01 to 1% by weight of carboxyl groups.

15. The process of claim 2 wherein the stabilized suspensions contain from 15–35% of fillers.

16. The process of claim 2 wherein said fillers contain calcium carbonate.

17. The process of claim 2 wherein said fillers are chalks.

18. In a process for the production of polyurethane resins which comprises reacting polyisocyanates and compounds containing active hydrogen atoms the improvement which comprises using as said compounds containing active hydrogen atoms the stable suspensions of claim 1.

19. The process of claim 6 wherein other olefinically unsaturated monomers are used in addition to the olefinically unsaturated carboxylic acid.

20. The process of claim 7 wherein other olefinically unsaturated monomers are used in addition to the olefinically unsaturated carboxylic acid.

21. The process of claim 19 wherein said other olefinically unsaturated monomer is styrene.

22. The process of claim 20 wherein said other olefinically unsaturated monomer is styrene.

23. The process of claim 13 wherein other monomers are used in addition to the $\alpha,\beta$-unsaturated carboxylic acids.

* * * * *